United States Patent [19]

Hirokawa

[11] Patent Number: 4,672,182

[45] Date of Patent: Jun. 9, 1987

[54] MEMORY CARD

[75] Inventor: Katsuhisa Hirokawa, Yokosuka, Japan

[73] Assignee: Kabushiki Kaisha Toshiba, Kawasaki, Japan

[21] Appl. No.: 661,311

[22] Filed: Oct. 16, 1984

[30] Foreign Application Priority Data

Oct. 17, 1983 [JP] Japan ............................ 58-193748

[51] Int. Cl.⁴ ........................................ G06K 19/06
[52] U.S. Cl. .................................. 235/436; 235/375; 235/454; 235/492
[58] Field of Search ............... 364/200, 900; 235/441, 235/492, 487, 61, 380, 375; 360/2

[56] References Cited

U.S. PATENT DOCUMENTS

| | | | |
|---|---|---|---|
| 3,874,586 | 4/1975 | Foote et al. | 235/61.11 |
| 4,094,462 | 6/1978 | Moschner | 235/419 |
| 4,105,156 | 8/1978 | Dethloff | 235/441 |
| 4,159,417 | 6/1979 | Rubincam | 235/375 |
| 4,222,516 | 9/1980 | Badet et al. | 235/492 |
| 4,442,345 | 4/1984 | Mollier et al. | 235/380 |
| 4,484,067 | 11/1984 | Obrecht | 235/380 |
| 4,544,835 | 10/1985 | Drexler | 235/487 |
| 4,544,836 | 10/1985 | Galvin et al. | 235/487 |
| 4,550,248 | 10/1985 | Hoppe et al. | 235/492 |
| 4,563,575 | 1/1986 | Hoppe et al. | 235/492 |
| 4,578,717 | 3/1986 | Lemelson | 360/2 |

FOREIGN PATENT DOCUMENTS

| | | |
|---|---|---|
| 0029894 | 6/1981 | European Pat. Off. . |
| 0030381 | 6/1981 | European Pat. Off. . |
| 0055986 | 7/1982 | European Pat. Off. . |
| 2417141 | 9/1979 | France . |
| 2496294 | 6/1982 | France . |
| 2069201 | 8/1981 | United Kingdom . |

OTHER PUBLICATIONS

IBM Technical Disclosure Bulletin, vol. 24, No. 6, Nov. 81, pp. 2985-2986.

Primary Examiner—Gareth D. Shaw
Assistant Examiner—Randy Lacasse
Attorney, Agent, or Firm—Cushman, Darby & Cushman

[57] ABSTRACT

A memory card has a card medium and a laser memory for storing data. A data processing section for storing encryption and/or decryption key data, an encryption and/or decryption program and a password is arranged in the card medium. When the same password as prestored in the data processing section is input, the input data is encrypted and/or decrypted in accordance with the encryption and/or decryption key data and the encryption and/or decryption program. The encrypted and/or decrypted data is stored in the laser memory.

10 Claims, 10 Drawing Figures

MEMORY CARD

BACKGROUND OF THE INVENTION

The present invention relates to a memory card.

Recently, memory cards have been frequently used for a data processing system. IC cards having an IC chip and a laser card having an optical (laser) memory have been developed as memory cards. A conventional IC card incorporates an IC chip having a CPU and a PROM. Data is stored in the PROM in a predetermined format under control of the CPU, so the stored data cannot be substantially read out by a third party. In this sense, the stored data can be kept confidential. However, since the memory section comprises the PROM (semiconductor memory) and has only a small capacity, e.g., several kilo bytes, this results in inconvenience. On the other hand, the conventional laser card has a large capacity. However, a third party can check the presence or absence of pits. Stored data can be read out by a third party and cannot be properly kept confidential. Furthermore, a magnetic card having a magnetic stripe cannot satisfy storage capacity, and, data protection.

SUMMARY OF THE INVENTION

It is an object of the present invention to provide a memory card having a large capacity, and, sufficient stored data protection.

In order to achieve the above object of the present invention, there is provided a memory card comprising a card medium, a data processing section arranged in the card medium for encrypting and decrypting input data, and a nonvolatile memory arranged in the card medium for storing encrypted data.

DETAILED DESCRIPTION OF THE PREFERRED EMBODIMENT

Figure 1:
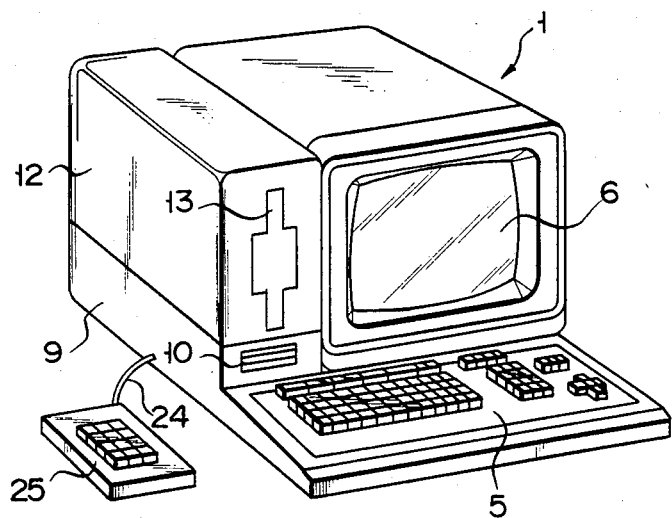
FIG. 1 is a perspective view of a data processing apparatus for a memory card according to an embodiment of the present invention.

A preferred embodiment of the present invention will be described with reference to the accompanying drawings. FIG. 1 is a perspective view of a data processing apparatus using a memory card according to an embodiment of the present invention. The outer appearance of this processing apparatus is the same as that of a conventional personal computer. A main body 1 comprises a keyboard 5, a CRT display 6, a card reading/writing section 9 for exchanging data with a memory card 11 (FIG. 3) inserted in a card insertion port 10, and a floppy disk drive 12 for exchanging data with a floppy disk 14 (FIG. 2) inserted in a floppy disk insertion port 13. A password input keyboard (numerical keys) 25 is also connected to the main body 1 through a cable 24.

Figure 2:
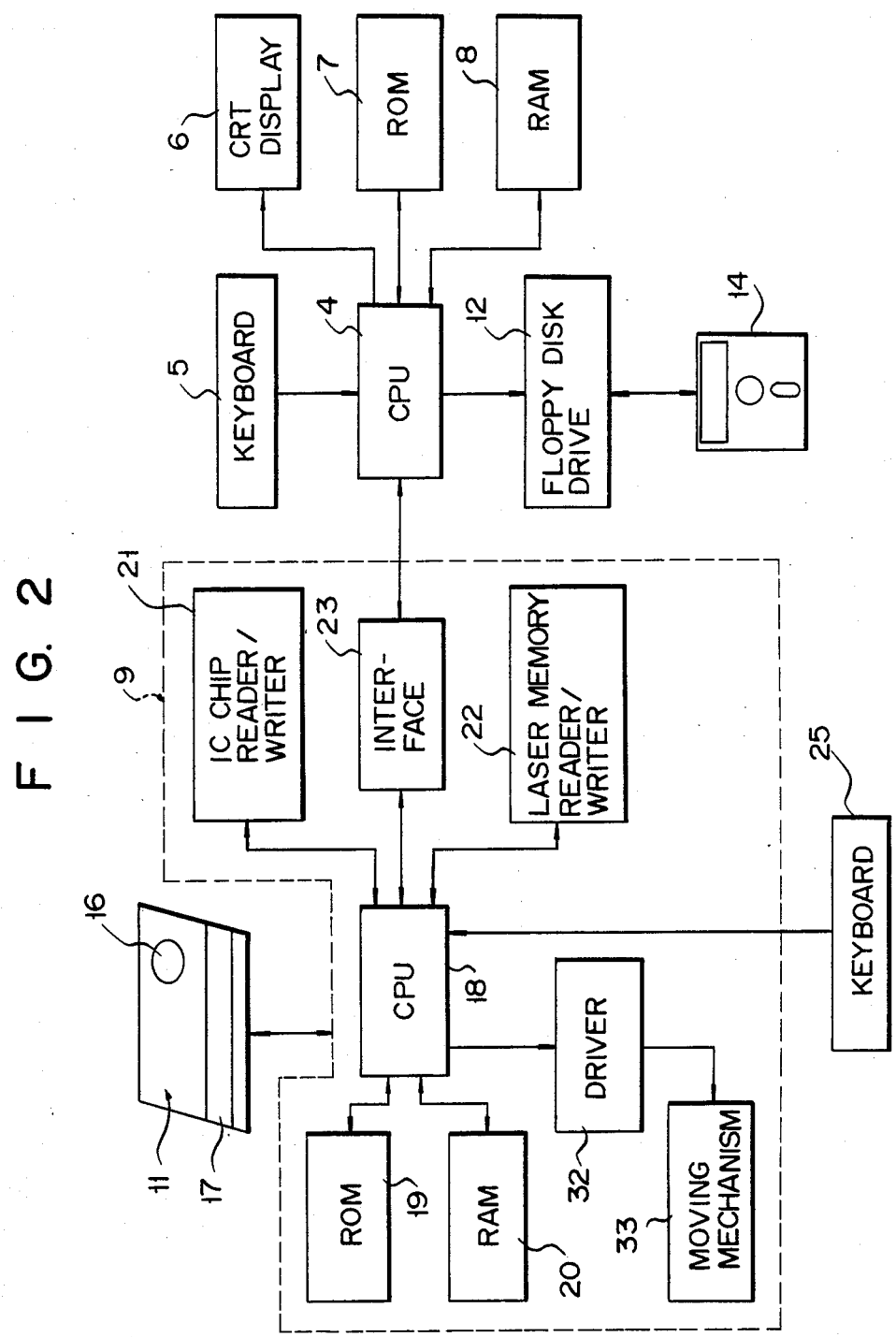
FIG. 2 is a circuit diagram of the data processing apparatus shown in FIG. 1.

FIG. 2 is a block diagram showing a circuit of the data processing apparatus shown in FIG. 1. The same reference numerals as in FIG. 1 denote the same parts as in FIG. 2. The keyboard 5, the card reading/writing section 9, and the floppy disk drive 12 are connected to a main CPU 4 for controlling the overall operation of the apparatus. The main CPU 4 is connected to a ROM 7 for storing a control program and to a RAM 8 for storing processed data.

The card reading/writing section 9 also has a CPU 18 and is connected to the main CPU 4 through an interface 23. A ROM 19 for storing a control program and a RAM 20 for storing processed data are connected to the CPU 18. The memory card 11 has an IC chip section 16 as a data processing section and a laser memory section 17 (or alternatively a magnetic memory section 17) serving as a data storage section. For this reason, the card reading/writing section 9 has an IC chip reader/writer 21 and a laser memory reader/writer 22 (or alternatively a magnetic memory reader/writer 22) which are connected to the CPU 18. The IC chip reader/writer 21 reads out data or writes data in the IC chip section 16. The laser memory reader/writer 22 reads out data or writes data in the laser memory section 17. The card reading/writing section 9 additionally has a moving mechanism 33 for receiving the memory card 11 inserted from the insertion port 10. The moving mechanism 33 is controlled by a driver 32 under the control of the CPU 18. The keyboard 25 is connected to the CPU 18.

Figure 3:
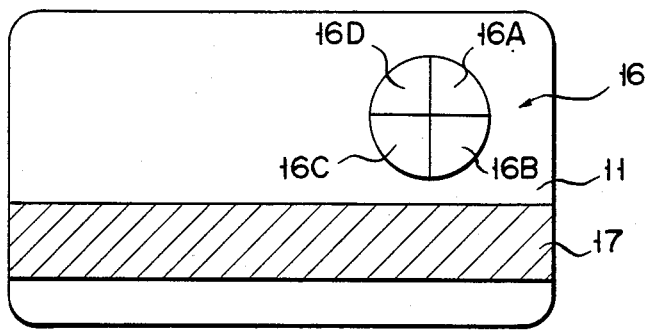
FIG. 3 is a plan view showing a surface of the memory card according to the embodiment of the present invention.
Figure 4:
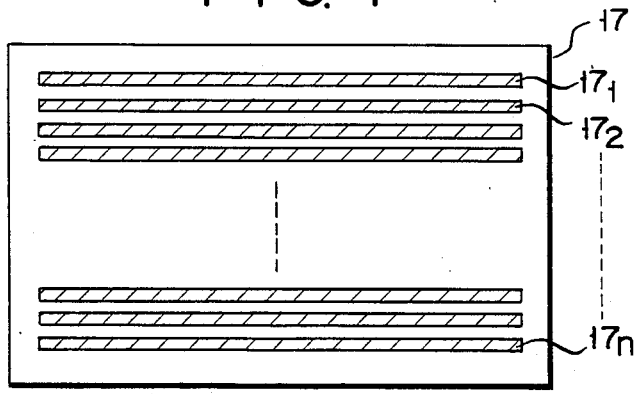
FIG. 4 is a plan view showing the track format of a laser memory section as a storage section in the memory card.

As shown in FIG. 3, the memory card 11 has the IC chip section 16 and the laser memory section 17 in the surface plane. Electrodes 16A to 16D of the IC chip section 16 are arranged on the surface of the memory card 11. The laser memory section 17 comprises a stripe coated with a metal such as tellurium or bismuth. The laser memory section 17 is divided into a plurality of tracks 17-1 to 17-n along the longitudinal direction of the card, as shown in FIG. 4 (or alternatively into a plurality of magnetic tracks 17-1 to 17-n). Data is stored in the track of the laser memory section 17. The memory card 11 must be inserted in the card insertion port 10 such that the longitudinal direction of the card 11 corresponds to the insertion direction.

Figure 5:
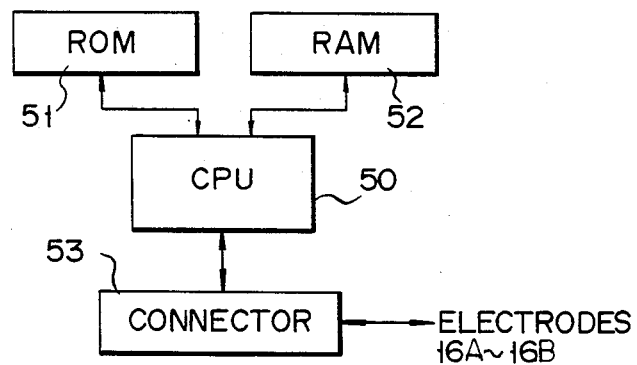
FIG. 5 is a block diagram showing the arrangement of an IC chip section as a data processing section in the memory card.

FIG. 5 is a block diagram showing the arrangement of the IC chip section 16 of the memory card 11. The IC chip section 16 comprises a CPU 50, a ROM 51 for storing a control program, password data, encryption key data, decryption key data, an encryption program and a decryption program, a RAM 52 for storing decrypted data, and a connector 53 connected to the electrodes 16A to 16D.

Figure 6:
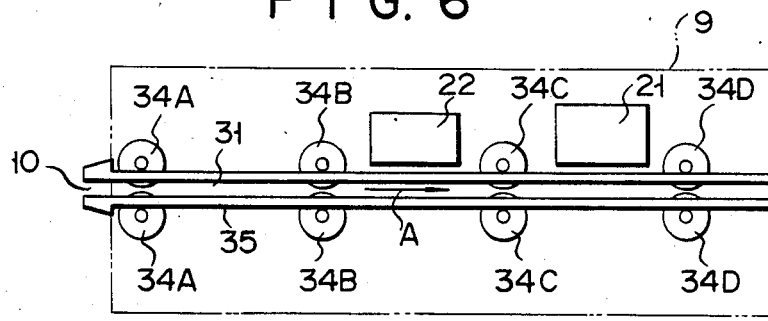
FIG. 6 is a sectional view of a card reading/writing section in the data processing apparatus shown in FIG. 1.

FIG. 6 shows the internal arrangement of the card reading/writing section 9. A conveying path 31 follows the card insertion port 10 to convey the memory card 11. Pairs of conveyor rollers 34A to 34D are disposed to convey the memory card 11 along the direction A while the memory card 11 is clamped therebetween. The pairs of rollers 34A to 34D are disposed at equal intervals along the conveying path 31. Each interval is set to be equal to the size, in the longitudinal direction, of the memory card 11 along the conveying direction, i.e., its length. Therefore, the memory card 11 can be smoothly conveyed along the conveying path 31. The conveying path 31 is defined by two conveying guides 35.

Figure 7:
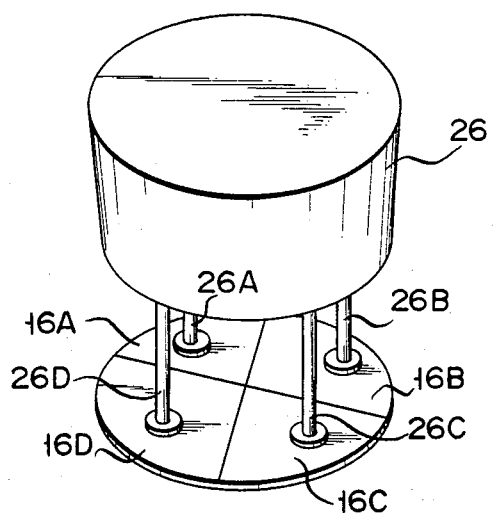
FIG. 7 is a view showing a state wherein an IC chip reader/writer in the card reading/writing section in FIG. 6 is brought into contact with the IC chip section in the memory card.

The laser memory reader/writer 22 (or alternatively the magnetic memory reader/writer) and the IC chip reader/writer 21 are arranged on the conveying guide 35. As shown in FIG. 7, terminals 26A to 26D of a connector 26 of the IC chip reader/writer 21 are brought into contact with the electrodes 16A to 16D of the IC chip section 16, respectively, and are electrically connected to the IC chip section 16.

Figure 8:
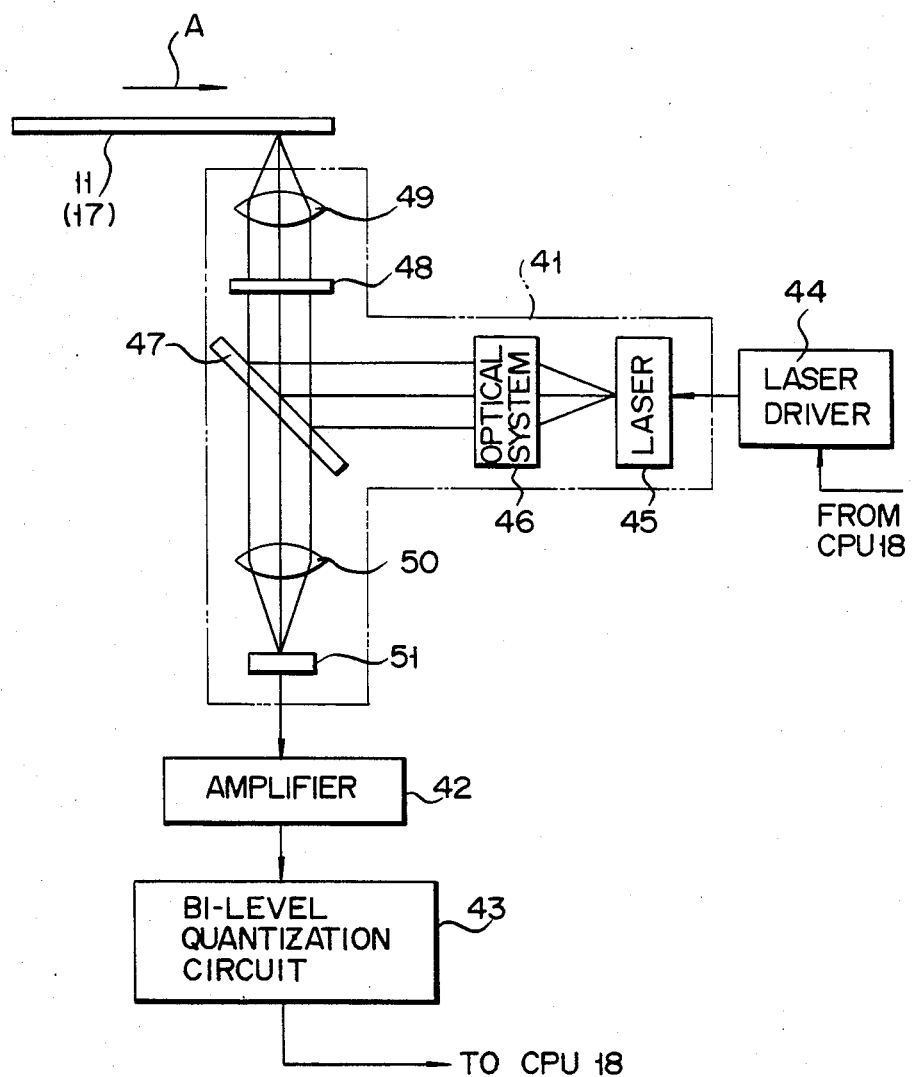
FIG. 8 is a block diagram showing the arrangement of a laser memory reader/writer in the data processing apparatus shown in FIG. 1.

The arrangement of the laser memory reader/writer 22 is illustrated in FIG. 8 (those skilled in the art would readily recognize that optical head 41 and laser driver 44 can be replaced with a magnetic head and that bi-level quantization circuit 43 can be replaced with a magnetic head read/write control logic circuit for the alternative magnetic memory system. Data is supplied from the CPU 18 to a laser driver 44, so that an optical head 41 drives a semiconductor laser oscillator 45 in response to this data. The optical head 41 then selectively forms pits in the laser memory section 17 in the memory card 11. The optical head 41 comprises the semiconductor laser oscillator 45, an optical system 46, a beam splitter 47, a $\lambda/4$ plate 48, an objective lens 49, a focusing lens 50 and a photoelectric transducer 51. Light reflected from the laser memory section 17 is converted by the photoelectric transducer 51 (such as a photodiode) to an electrical signal. The electrical signal is supplied to an amplifier 42, and an amplified signal is supplied to a bi-level quantization circuit 43. Output from the bi-level quantization circuit 43 represents the presence/absence of pits formed in the laser memory section 17, and is supplied to the CPU 18.

Data writing in and data reading from the memory card 11 will be described with reference to FIGS. 9 and 10, respectively. The data write operation will be first described with reference to the flow chart in FIG. 9. An operator inserts the memory card 11 in the card insertion port 10 in step 100. The memory card 11 is fed by the moving mechanism 33 in the card reading/writing section 9, so that the IC chip section 16 in the memory card 11 is opposed to the IC chip reader/writer 21 in the card reading/writing section 9. As shown in FIG. 7, the terminals 26A to 26D of the connector 26 of the IC chip reader/writer 21 are brought into contact with the electrodes 16A to 16D of the IC chip section 16 so as to accomplish electrical connections. Voltage is thus applied to the IC chip section 16.

In step 105, data to be stored in the memory card 11 is supplied to the CPU 18 and is stored in the RAM 20 in the card reading/writing section 9 through the interface 23 and the CPU 18. This data input is performed by the keyboard 5, the floppy disk 14 and the like. When the data has been input, the main CPU 4 causes the CRT display 6 to display a prompt "INPUT PASSWORD BY KEYBOARD". The operator then enters the password in accordance with this display in step 110. The CPU 18 then supplies the password data to the CPU 50 in the IC chip section 16 through the IC chip reader/writer 21. In step 115, the CPU 50 compares the input password data with the password data stored in the ROM 51. A comparison signal is supplied to the CPU 18 in the card reading/writing section 9 through the IC chip reader/writer 21. The CPU 18 detects in step 120 whether or not the input password is correct. If the answer is NO in step 120, the write operation is ended.

However, if the answer is YES in step 120, the CPU 18 supplies the input data stored in the RAM 20 to the CPU 50 in the IC chip section 16 through the IC chip reader/writer 21 in step 125. In step 130, the CPU 50 encrypts data in accordance with the encryption key data and the encryption program which are stored in the ROM 51. The data and encryption key data are processed in accordance with the encryption program. Thereafter, in step 135, the encrypted data is read out from the IC chip section 16 and is supplied to the memory card reading/writing section 9. The encrypted data is then stored in the RAM 20. The CPU 18 then causes the moving mechanism 33 to move the memory card 11. In step 140, the encrypted data in the RAM 20 is written in the laser memory section 17 (or alternatively in the magnetic memory 17). In other words, the laser driver 44 modulates the laser oscillator 45 in accordance with the encrypted data to form pits in the laser memory section 17 in accordance with the laser beam from the laser oscillator 45. The CPU 18 checks in step 145 whether or not the next input data is present. If the answer is YES in step 145, the operation after step 125 is repeated. However, if the answer is NO in step 145, the write operation is ended.

Data reading from the memory card 11 will be described with reference to the flow chart of FIG. 10. In the same manner as in the write mode, the operator inserts the memory card 11 in the card insertion port 10 in step 200. When the insertion of the card has been detected, the main CPU 4 causes the CRT display 6 to display a prompt "INPUT PASSWORD BY KEYBOARD". The operator enters the password in accordance with this display in step 205. In step 210, the input password is compared with the password data pre-stored in the RAM 20. In step 215 the CPU 18 detects whether or not the input password is correct. If the answer is NO in step 215, the data read operation is ended.

However, if the answer is YES in step 215, the CPU 18 causes the moving mechanism 33 to move the memory card 11. In step 220, the encrypted data is read out from the laser memory section 17. A reproduction beam is generated from the laser oscillator 45 actuated by the laser driver 44 and irradiates a predetermined track in the laser memory section 17. Light reflected from the laser memory section 17 is guided to the photoelectric transducer 51 through the objective lens 49, the $\lambda/4$ plate 48, the beam splitter 47 and the focusing lens 50. An output electrical signal from the photoelectric transducer 51 is amplified by the amplifier 42 and is quantized by the bi-level quantization circuit 43. The read data is then supplied to the CPU 18. In step 225, the CPU 18 supplies read encrypted data to the CPU 50 in the IC chip section 16 through the IC chip reader/writer 21. In step 230, the CPU 50 decrypts the encrypted data in accordance with the decryption key data and the decryption program which are stored in the ROM 51. Thereafter, the decrypted data is read out from the IC chip section 16 and is supplied to the main CPU 4. The main CPU 4 performs various types of processing in accordance with the data supplied. For example, in step 240, the read data is displayed on the CRT display 6. Thereafter, it is checked in step 245 whether or not the next data to be read is present. If the answer is YES in step 245, the operation after step 220 is repeated. However, if the answer is NO in step 245, the read operation is completed.

According to the embodiment described above, the laser memory which has a large capacity is used as the data memory, and the data encrypted by the CPU in the card is stored in the laser memory section. Therefore, the memory card has a large capacity and ensures data protection. Furthermore, encryption is started only when the input password coincides with the stored password, thereby further ensuring data protection.

The present invention is not limited to the particular embodiment described above. Various changes and modifications may be made within the spirit and scope of the invention. For example, the password is used for identifying the operator. However, a voiceprint or fingerprint may be used in place of the password. The data memory is not limited to the laser memory but may be extended to include any large-capacity nonvolatile memory. A magnetic memory of vertical magnetization may be used in place of the laser memory.

Figure 9:
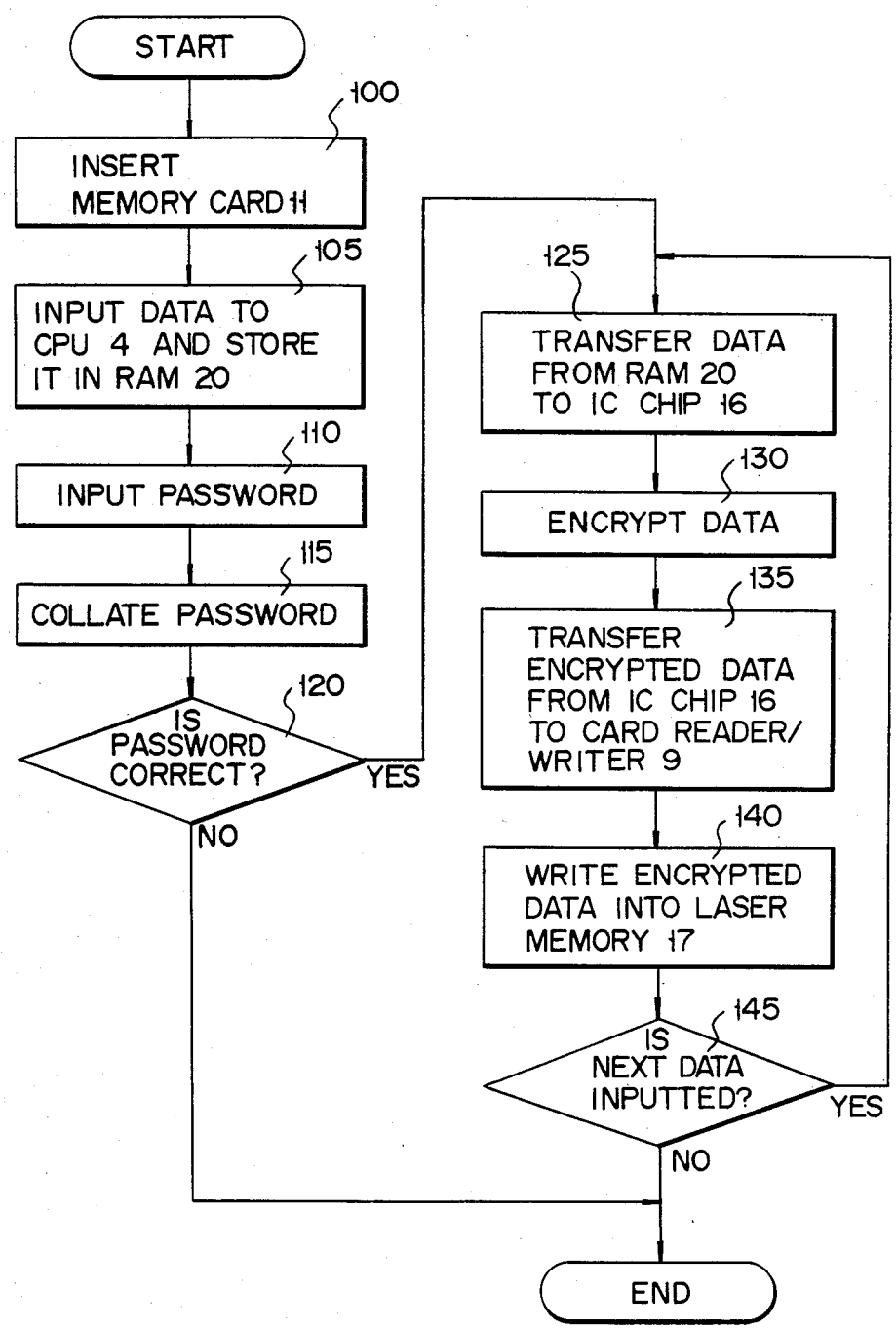
FIG. 9 is a flow chart for explaining data writing in the memory card in the data processing apparatus shown in FIG. 1.
Figure 10:
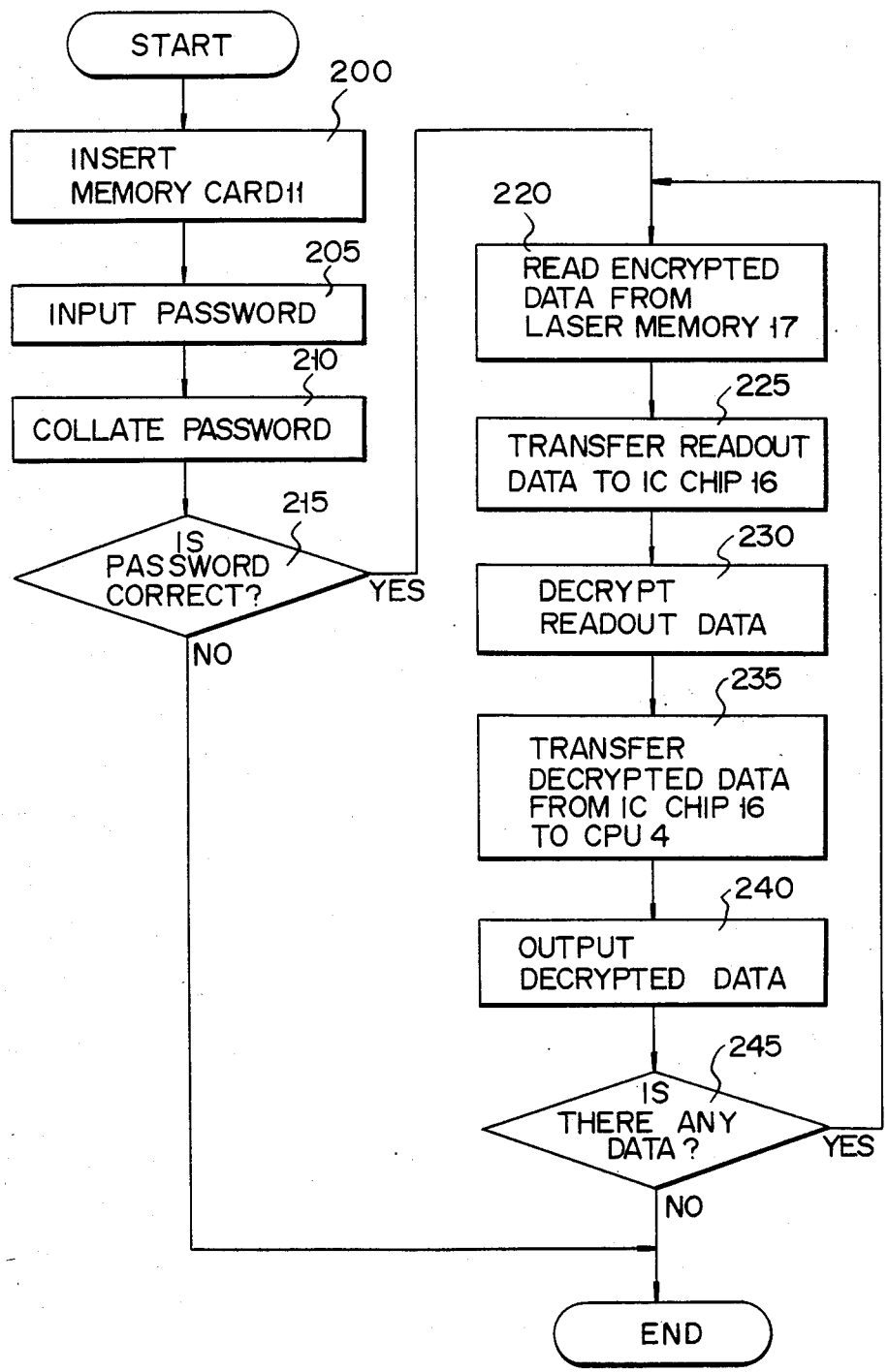
FIG. 10 is a flow chart for explaining data reading from the memory card in the data processing apparatus shown in FIG. 1.

Since those of ordinary skill in the art would recognize that the magnetic memory of vertical magnetization could be substituted with only minor changes to FIGS. 2, 8, 9 (step 140) and 10 (step 220) and with substantially the same operating description as that provided for the laser memory, a detailed description of operation has been omitted.

What is claimed is:

1. A memory card for use in a system including an external read/writing selection, said memory card comprising:
    data processing means, provided in said card medium, for encrypting/decrypting input data; and
    memory means, provided on the surface of said card medium and not connected to said data processing means, for storing the input data encrypted by said data processing means; wherein
    the external card read/writing section writes encrypted data output from said data processing means in said memory means, and reads written data from said memory means, said read data being sent to said data processing means and decrypted.

2. A memory card according to claim 1, wherein said memory means comprises a laser memory.

3. A memory card according to claim 1, wherein said memory means comprises a magnetic memory of vertical magnetization.

4. A memory card according to claim 1, wherein said data processing means stores a password and starts encryption and/or decryption when the correct password is externally entered.

5. A memory card according to claim 1, wherein said data processing means stores encryption and/or decryption key data and an encryption and/or decryption program and processes the input data and the encryption and/or decryption key data in accordance with the encryption and/or decryption program.

6. A memory card system comprising:
    a card medium including data processing means provided in said card medium, for encrypting/decrypting input data, and memory means, provided on the surface of said card medium and not connected to said data-processing means, for storing the encrypted data; and
    an external card reading/writing section or writing the encrypted data output from said data processing means in said memory means, and for reading the written data from said memory means, said read-out data being sent to said data-processing means and decoded.

7. A memory card according to claim 6, wherein said memory means comprises a laser memory.

8. A memory card according to claim 6, wherein said memory means comprises a magnetic memory of vertical magnetization.

9. A memory card according to claim 6, wherein said data processing means stores a password and starts encryption and/or decryption when the correct password is externally entered.

10. A memory card according to claim 6, wherein said data processing means stores encryption and/or decryption key data and an encryption and/or decryption program and processes the input data and the encryption and/or decryption key data in accordance with the encryption and/or decryption program.

* * * * *